(12) United States Patent
Roscher et al.

(10) Patent No.: US 6,984,483 B1
(45) Date of Patent: Jan. 10, 2006

(54) ORGANICALLY MODIFIED SILICIC ACID POLYCONDENSATES, PRODUCTION AND USE THEREOF

(75) Inventors: Christof Roscher, Wuerzburg (DE); Ralf Buestrich, Wuerzburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 91 days.

(21) Appl. No.: 10/030,910

(22) PCT Filed: May 31, 2000

(86) PCT No.: PCT/DE00/01833

§ 371 (c)(1),
(2), (4) Date: May 20, 2002

(87) PCT Pub. No.: WO01/04186

PCT Pub. Date: Jan. 18, 2001

(30) Foreign Application Priority Data

Jul. 13, 1999 (DE) ................................ 199 32 629

(51) Int. Cl.
*C08G 77/06* (2006.01)
*C08G 77/14* (2006.01)
*G03F 7/075* (2006.01)

(52) U.S. Cl. ............... 430/280.1; 430/281.1; 430/282.1; 430/283.1; 430/284.1; 430/285.1; 430/288.1; 430/286.1; 430/287.1; 528/394; 528/425; 522/99; 522/148

(58) Field of Classification Search ............ 430/280.1, 430/281.1, 282.1, 283.1, 284.1, 285.1, 286.1, 430/287.1, 288.1; 528/394, 425; 522/99, 522/148

See application file for complete search history.

(56) References Cited

U.S. PATENT DOCUMENTS 4,824,875 A * 4/1989 Gutek .......................... 522/9

5,292,849 A * 3/1994 Fujioka et al. ............... 528/18

FOREIGN PATENT DOCUMENTS

DE 196 13 650 C1 4/1997
EP 0 812 894 A2 12/1997

OTHER PUBLICATIONS

Endo, Takeshi, et al., "New Acrylates and Methacrylates Bearing Pendant Spiro Ortho Ester Groups," *Journal of Polymer Science: Part C: Polymer Letters*, vol. 26, pp. 517-520 (1988).

* cited by examiner

*Primary Examiner*—Cynthia Hamilton
(74) *Attorney, Agent, or Firm*—Foley & Lardner LLP

(57) ABSTRACT

The invention relates to organically modified, stable in storage, UV curable, NIR permeable silicic acid polycondensates which are photostructurable in layers having a thickness of 1 to 150 μm. The invention also relates to the production and use thereof as negative resists. The polycondensates according to the invention are obtainable by condensation of organically modified silanediols of the formula I with organically modified silanes of the formula II.

$$Ar_2Si(OH)_2 \quad (I)$$

$$RSi(OR')_3 \quad (II)$$

The radicals are identical or different and have the following meaning:
Ar=a radical having 6 to 20 carbon atoms and at least one aromatic group,
R=an organic radical having 2 to 15 carbon atoms and at least one epoxy group and/or at least one C=C double bond,
R'=methyl or ethyl.

Condensation occurs without the addition of water. The molar ratio of said compounds I and II is 1:1. Up to 90 mole percent of said compound of the formula II can be replaced by co-condensable compounds of boron, aluminum, silicon, germanium, titanium and zirconium.

23 Claims, No Drawings

ORGANICALLY MODIFIED SILICIC ACID POLYCONDENSATES, PRODUCTION AND USE THEREOF

The invention relates to organically modified, stable in storage, UV curable, NIR permeable silicic acid polycondensates which are photostructurable in layers having a thickness of 1 to 150 µm, as well as to the production and use thereof.

Organically modified silicic acid polycondensates are widely used e.g. as coatings for a very wide range of substrates or in the production of moldings. In contrast to merely organic polymers, organically modified silicic acid polycondensates have numerous advantageous properties, as for example a higher temperature resistance and dimensional stability under heat, a better adhesion, etc.

Organically modified silicic acid polycondensates according to prior art are obtained by aqueous sol-gel-synthesis, i.e. by hydrolytic condensation reactions, and therefore they comprise Si—OH groups. A disadvantage of said organically modified silicic acid polycondensates containing Si—OH groups is the bad reproducibility of their synthesis and the insufficient stability in storage. The Si—OH groups contained in the system react slowly by self-condensation, which results in a viscosity increase of the system.

A further disadvantage of said systems is an increased loss and the formation of cracks upon their application. Systems containing Si—OH groups release water and alcohol under shrinkage when thermally hardened. The shrinkage and the emission of volatile components leads to a formation of cracks, particularly in case of higher layer thickness.

Said inorganic postcondensation is very disadvantageous, particularly for structurable materials. Prior to structuring by organic polymerization, the inorganic oligomer formation should already be terminated, the mobility of the Si—OH groups after said organic polymerization being restricted. If the inorganic oligomer formation is not terminated, SiOH groups remain in the system and lead to an increased absorption of water.

A further disadvantage of said systems is their high absorption by said Si—OH groups in the NIR range, particularly at a wave length of 1550 nm which is of great importance in optical data processing.

The object of the present invention is therefore to provide materials for coatings and for the production of moldings, which materials are stable in storage, UV curable, NIR permeable and which are photostructurable in layers of even high thickness. The intention is that said materials should adhere to a very wide range of substrates and be applicable by usual methods.

This object is achieved by providing organically modified silicic acid polycondensates which are obtainable by condensation of one or more organically modified silanediols of the general formula I $$Ar_2Si(OH)_2 \quad (I)$$

with one or more organically modified silanes of the general formula II $$RSi(OR')_3 \quad (II).$$

Instead of the monomer compounds of the general formula I, precondensates derived therefrom or mixtures of monomers and precondensates can also be used for producing silicic acid polycondensates according to the invention. The molar ratio of the compounds I and II in relation to the monomers is 1:1.

Up to 90 mole percent of the compound of general formula II can be replaced by one or more co-condensable compounds of boron, aluminum, silicon, germanium, titanium and zirconium. If compounds of the general formula II are replaced by said co-condensable compounds, the molar ratio of the compounds I and II obviously changes. When replacing compounds of the general formula II by co-condensable compounds it is to be taken care that the quantity of the condensable groups of compound II be replaced by an equivalent quantity of co-condensable groups. It has to be considered that in the compound of general formula II, only two out of three alkoxy groups are capable of condensation.

The radicals of the general formulas I and II are identical or different and have the following meaning:

Ar=a radical having 6 to 20 carbon atoms and at least one aromatic group,

R=an organic radical having 2 to 15 carbon atoms and at least one epoxy group and/or at least one C=C double bond, R'=methyl or ethyl.

Silanes of the general formula II are condensable with silanediols of the general formula I via radicals OR', whereby separation of methanol or ethanol, respectively, occurs. In the course of said condensation, an inorganic network having Si—O—Si bridges is built up. The free valences of the silicon atoms are saturated by Ar, R and R'O radicals. The general reaction scheme of the condensation looks as follows:

$$nAr_2Si(OH)_2 + nRSi(OR')_3 \rightarrow \text{polycondensate} + 2nR'OH$$

Silanes of the general formula II can further be polymerized via the epoxy groups and over the C=C double bonds of the radicals R, respectively. An organic network is built up by polymerizing said radicals R.

In preferred embodiments of the silicic acid polycondensates according to the invention, the radical Ar of the general formula I means a substituted or unsubstituted aromatic radical. It is particularly preferred that Ar means phenyl, tolyl, styryl or naphthyl. Concrete examples of compounds of the general formula are

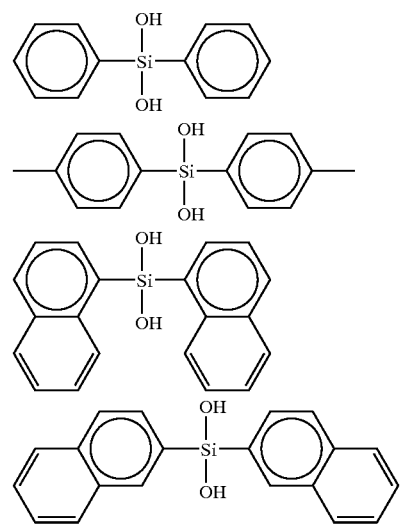

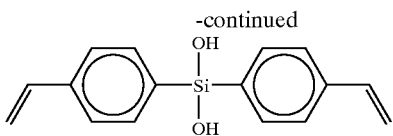

Compounds of the general formula I can be purchased or produced according to methods as described e.g. in "Chemie und Technologie der Silicone" (Walter Noll, Verlag Chemie, Weinheim/Bergstraße, 1986).

Without limitation as to generality, concrete examples of compounds of the general formula II are

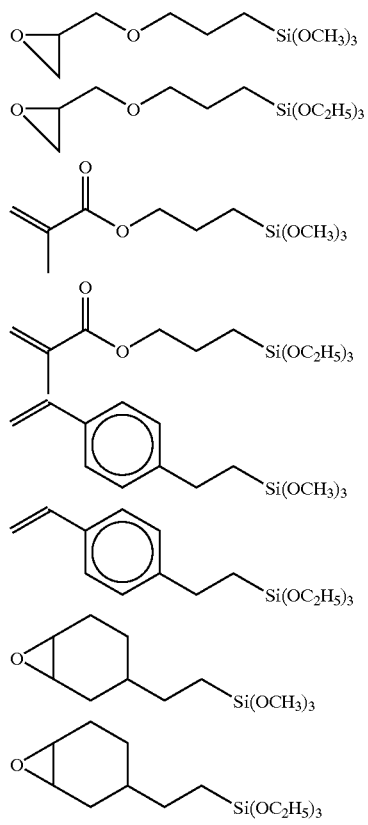

Further concrete embodiments of the radicals R look e.g. as follows:

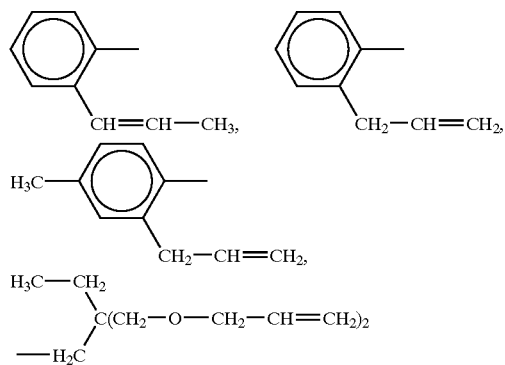

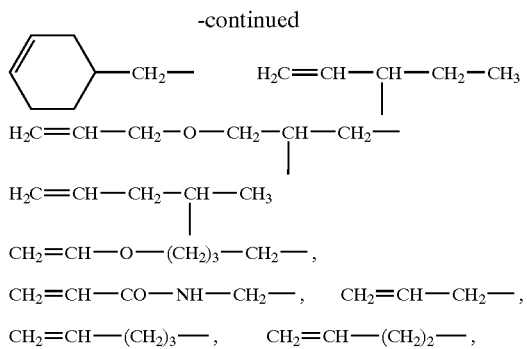

In preferred embodiments of the polycondensates according to the invention, the radical R containes one or more acryl and/or methacryl groups in compounds of the general formula II. Without limitation as to generality, concrete embodiments of such radicals R are

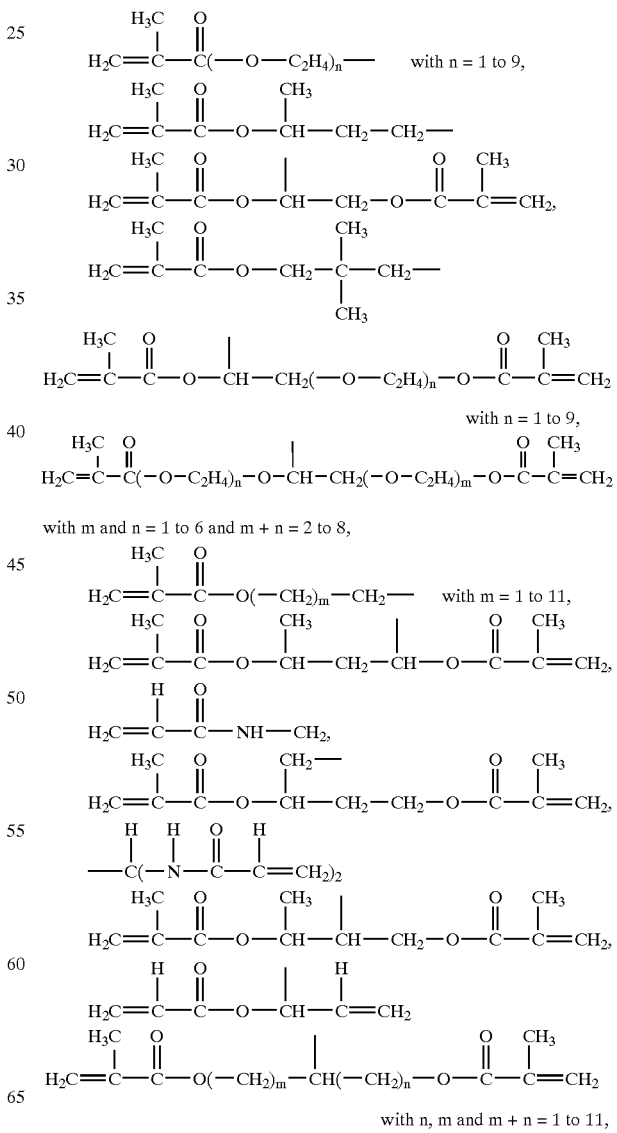

-continued
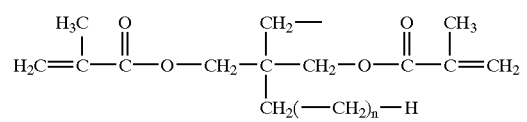
with n = 0 and 1,
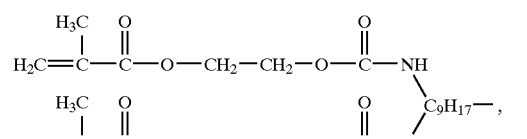
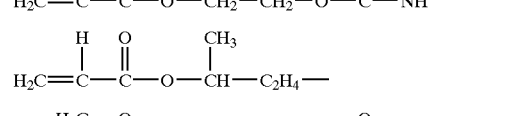
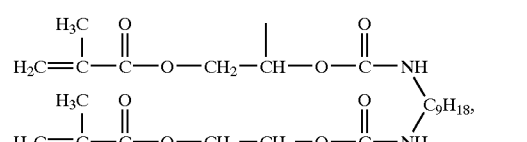
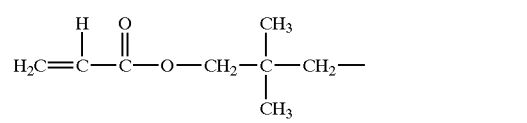
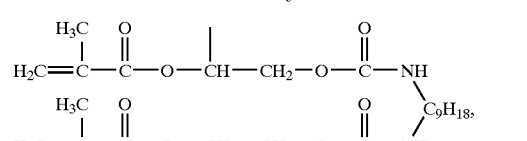
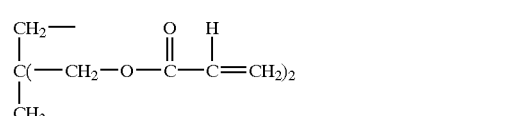
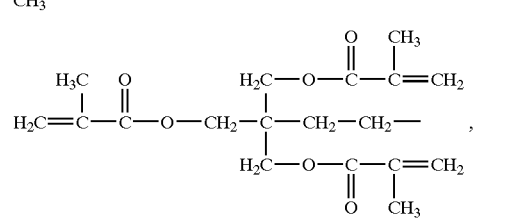
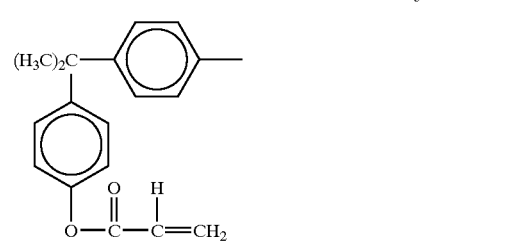
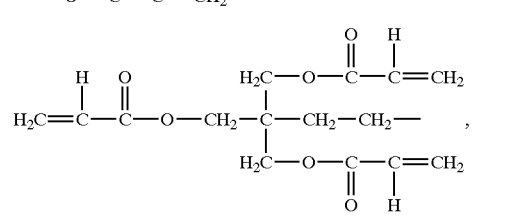
-continued
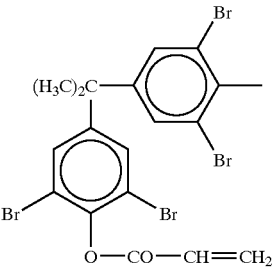
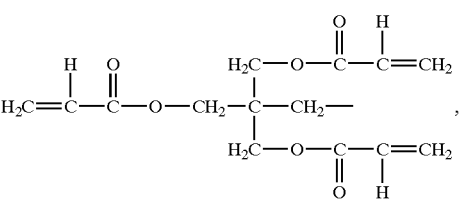
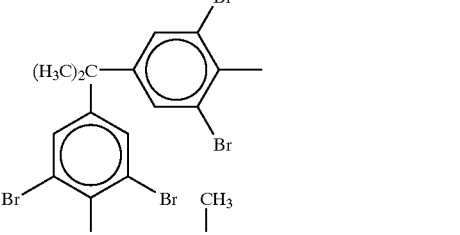
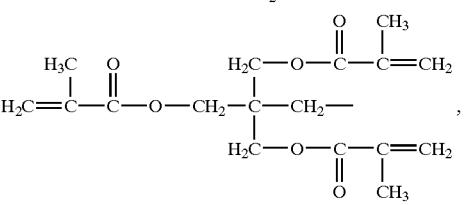
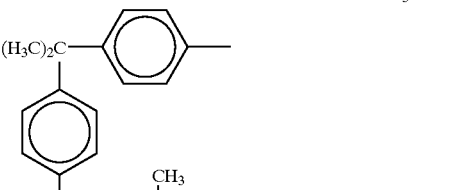
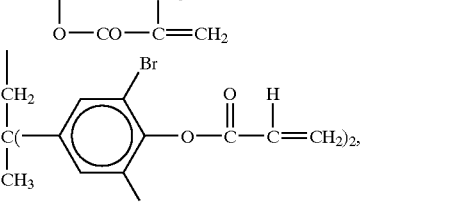
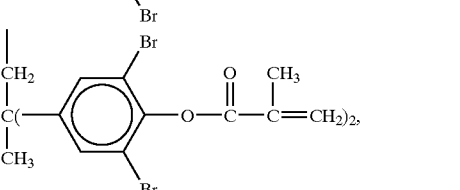
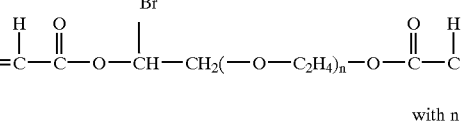
with n = 0 to 9, -continued

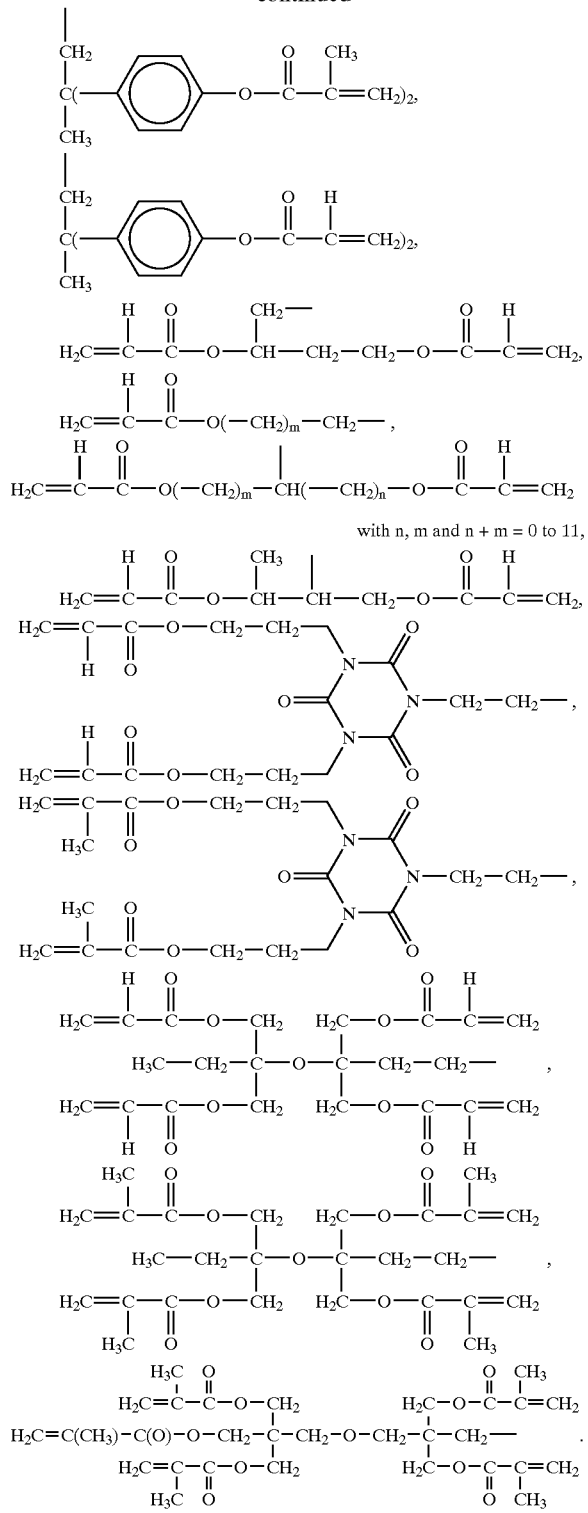

with n, m and n + m = 0 to 11,

Compounds of the general formula II can be purchased or produced according to methods, as described e.g. in "Chemie und Technologie der Silicone" (Walter Noll, Verlag Chemie, Weinheim/Bergstrasse, 1986).

For building up the inorganic network and for producing the silicic acid polycondensates according to the invention, the compounds of the general formula I and II are condensed. Polycondensation is preferably effected according to the sol-gel-method and at temperatures between 20 and 100° C., preferably between 50 and 100° C., or at the boiling point of the lowest boiling component. Particularly preferred is a condensation at the boiling temperature of the methanol. After condensation, devolatilization is effected by usual methods, e.g. by heating and/or negative pressure.

For initializing or accelerating condensation, Lewis or Brönstedt bases can be used. Examples thereof are amines, as e.g. N-methylimidazole or benzyldimethylamine. In preferred embodiments, triethylamine, ammonium fluoride, or one or more alkaline earth hydroxides is/are used as bases. It is particularly preferred to use barium hydroxide as alkaline earth hydroxide. If insoluble bases are used in the reaction medium, such as e.g. alkaline earth hydroxides, it is recommended to separate them, e.g. by filtration, from the resulting mixture after the condensation has terminated. Further, chelatized or non-chelatized aluminum or zirconium alkoxides can be used for condensation instead of the aforementioned bases.

For producing the polycondensates according to the invention, up to 90 mole percent of the compound of the general formula II can be replaced by one or more co-condensable compounds of boron, aluminum, silicon, germanium, titanium and zirconium.

In a further embodiment of the silicic acid polycondensates according to the invention, compounds of the general formula II are replaced by one or more co-condensable compounds of the general formula III.

$$M(OR'')_3 \qquad (III)$$

The radicals R" are identical or different, M means boron or aluminum and R" represents an alkyl radical having 1 to 4 carbon atoms. In the general formula III, all three alkoxy radicals are co-condensable with compounds of the general formula I, so that a replacement of compounds of the general formula II by compounds of the general formula III is effected at a molar ratio of 3:2. This means that three molecules, respectively, of compound II are to be replaced by two molecules of compound III.

Concrete examples of compounds of the general formula III are $Al(OCH_3)_3$, $Al(OC_2H_5)_3$, $Al(O\text{-}n\text{-}C_3H_7)_3$, $Al(O\text{-}i\text{-}C_3H_7)_3$, $Al(O\text{-}n\text{-}C_4H_9)_3$, $Al(O\text{-}i\text{-}C_4H_9)_3$, $Al(O\text{-}s\text{-}C_4H_9)_3$, $B(O\text{-}n\text{-}C_4H_9)_3$, $B(O\text{-}t\text{-}C_4H_9)_3$, $B(O\text{-}n\text{-}C_3H_7)_3$, $B(O\text{-}i\text{-}C_3H_7)_3$, $B(OCH_3)_3$ and $B(OC_2H_5)_3$.

When replacing compounds of the general formula II partly by the aforementioned aluminum and boron compounds, the addition of a base for effecting condensation is no longer required. The aforementioned aluminum and boron compounds act as condensation catalyst. A further advantage of said embodiment is that excess condensation catalyst does not have to be removed from the reaction medium after condensation has terminated, since no free condensation catalyst is present any more. It is completely incorporated in the inorganic network.

By incorporating aluminum and/or boron atoms into the inorganic network, the hardness and the chemical resistance of the resulting polycondensate is increased.

In a further embodiment of the silicic acid polycondensates according to the invention, compounds of the general formula II are replaced by one or more co-condensable compounds of the general formula IV.

$$M'(OR'')_4 \qquad (IV)$$

The radicals R" are identical or different, M' means silicon, germanium, titanium or zirconium, and R" represents an alkyl radical having 1 to 4 carbon atoms. In the general formula IV, all four alkoxy radicals are co-condensable with compounds of the general formula I, so that a replacement of compounds of the general formula II by compounds of the general formula IV is effected at a molar ratio of 2:1. This means that two molecules of compound II are replaced by one molecule of compound IV.

Concrete examples of compounds of the general formula IV are $Si(OCH_3)_4$, $Si(OC_2H_5)_4$, $Si(O-n-C_3H_7)_4$, $Si(O-i-C_3H_7)_4$, $Si(O-n-C_4H_9)_4$, $Si(O-i-C_4H_9)_4$, $Si(O-s-C_4H_9)_4$, $Ge(OCH_3)_4$, $Ge(OC_2H_5)_4$, $Ge(O-n-C_3H_7)_4$, $Ge(O-i-C_3H_7)_4$, $Ge(O-n-C_4H_9)_4$, $Ge(O-i-C_4H_9)_4$, $Ge(O-s-C_4H_9)_4$, $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, $Ti(O-i-C_4H_9)_4$, $Ti(O-s-C_4H_9)_4$, $Zr(OCH_3)_4$, $Zr(OC_2H_5)_4$, $Zr(O-n-C_3H_7)_4$, $Zr(O-i-C_3H_7)_4$, $Zr(O-n-C_4H_9)_4$, $Zr(O-i-C_4H_9)_4$ and $Zr(O-s-C_4H_9)_4$.

When replacing compounds of the general formula II partly by the above mentioned compounds of titanium and zirconium, said titanium and zirconium compounds also cause condensation, the addition of a catalyst, e.g. of a base, not being required any more. Thus, the above mentioned titanium and zirconium compounds take over the function of a condensation catalyst. A further advantage of said embodiment is that after condensation is terminated, excess catalyst does not have to be removed from the reaction medium any more since it is completely incorporated in the inorganic network.

By incorporating germanium and/or titanium and/or zirconium atoms into the inorganic network, the hardness and the resistance to abrasion of the resulting polycondensate are increased on the one hand due to the higher inorganic network density. On the other hand, the refractive index of the resulting polycondensate is shifted to higher values. Therefore, by selectively incorporating said atoms in the inorganic network, the refractive index of the resulting material can selectively be adjusted. Therefore, said materials are excellently suited for use in optical components, since a selective adjustment of the refractive index, e.g. in the light transmission for coupling and decoupling, is absolutely required in said optical components.

In further embodiments of the silicic acid polycondensates according to the invention, up to 90 mole percent of the compounds of the general formula II are replaced by one or more compounds of the general formula V.

$$R^1Si(OR')_3 \quad (V)$$

The radicals R' are identical or different and mean methyl or ethyl. The radical $R^1$ is an organic radical having the following meaning:

$R^1 = CF_3—(CF_2)_n—C_2H_4—$, with n=0 to 7, $R^2HN—(CH_2)_3—$, with $R^2$=H, $CH_3$, $C_2H_5$ or $C_2H_4—NHR^2$, $H_2N—C_2H_4—NH—CH_2—C_6H_4—C_2H_4—$, substituted and unsubstituted alkyl having 1 to 8 carbon atoms, substituted and unsubstituted phenyl, tolyl or naphthyl.

Compounds II are replaced by compounds of the general formula V at a molar ratio of 1:1. Concrete examples of compounds of the general formula V are $CF_3—C_2H_4—Si(OCH_3)_3$, $CF_3—CF_2—C_2H_4—Si(OCH_3)_3$, $CF_3—(CF_2)_2—C_2H_4—Si(OCH_3)_3$, $CF_3—(CF_2)_3—C_2H_4—Si(OCH_3)_3$, $CF_3—(CF_2)_4—C_2H_4—Si(OCH_3)_3$, $CF_3—(CF_2)_5—C_2H_4—Si(OCH_3)_3$, $CF_3—(CF_2)_6—C_2H_4—Si(OCH_3)_3$, $CF_3—(CF_2)_7—C_2H_4—Si(OCH_3)_3$, $CF_3—C_2H_4—Si(OC_2H_5)_3$, $CF_3—CF_2—C_2H_4—Si(OC_2H_5)_3$, $CF_3—(CF_2)_2—C_2H_4—Si(OC_2H_5)_3$, $CF_3—(CF_2)_3—C_2H_4—Si(OC_2H_5)_3$, $CF_3—(CF_2)_4—C_2H_4—Si(OC_2H_5)_3$, $CF_3—(CF_2)_5—C_2H_4—Si(OC_2H_5)_3$, $CF_3—(CF_2)_6—C_2H_4—Si(OC_2H_5)_3$, $CF_3—(CF_2)_7—C_2H_4—Si(OC_2H_5)_3$, $H_3C—Si(OCH_3)_3$, $H_3C—Si(OC_2H_5)_3$, $H_5C_2—Si(OCH_3)_3$, $H_5C_2—Si(OC_2H_5)_3$, $H_7C_3—Si(OCH_3)_3$, $H_7C_3—Si(OC_2H_5)_3$,

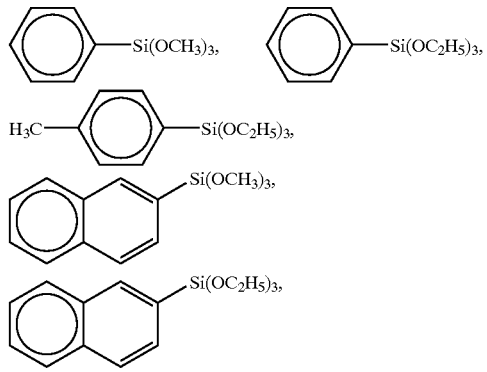

By replacing compounds of the general formula II by compounds of the general formula V, the refractive index and the optical attenuation of the polycondensates according to the invention can be adapted to the requirements of each respective application case. At 1310 nm and at 1550 nm, alkylated components for example cause a reduction of the refractive index simultaneously increasing attenuation. Probably, C—H— harmonic oscillations and combination vibrations of the polycondensate according to the invention are responsible for this. Arylated components cause an increase of the refractive index (e.g. at 1550 nm) without significantly increasing the attenuation of the material according to the invention. Fluorinated components reduce both the refractive index and the attenuation of the polycondensates according to the invention.

Further concrete embodiments of compounds of the general formula V look as follows. $H_2N—(CH_2)_3—Si(OCH_3)_3$, $H_3C—NH—(CH_2)_3—Si(OCH_3)_3$, $H_5C_2—NH—(CH_2)_3—Si(OCH_3)_3$, $H_2N—C_2H_4—NH—(CH_2)_3—Si(OCH_3)_3$, $H_3C—NH—C_2H_4—NH—(CH_2)_3—Si(OCH_3)_3$, $H_5C_2—NH—C_2H_4—NH—(CH_2)_3—Si(OCH_3)_3$, $H_2N—(CH_2)_3—Si(OC_2H_5)_3$, $H_3C—NH—(CH_2)_3—Si(OC_2H_5)_3$, $H_5C_2—NH—(CH_2)_3—Si(OC_2H_5)_3$, $H_2N—C_2H_4—NH—(CH_2)_3—Si(OC_2H_5)_3$, $H_3C—NH—C_2H_4—NH—(CH_2)_3—Si(OC_2H_5)_3$, $H_5C_2—NH—C_2H_4—NH—(CH_2)_3—Si(OC_2H_5)_3$, $H_2N—C_2H_4—NH—CH_2—C_6H_4—C_2H_4—Si(OCH_3)_3$, $H_2N—C_2H_4—NH—CH_2—C_6H_4—C_2H_4—Si(OC_2H_5)_3$, $H_2N—(CH_2)_3—Si(OCH_3)_3$, $H_3C—N(CH_3)—(CH_2)_3—Si(OCH_3)_3$, $H_5C_2—N(CH_3)—(CH_2)_3—Si(OCH_3)_3$, $H_2N—C_2H_4—N(CH_3)—(CH_2)_3—Si(OCH_3)_3$, $H_3C—N(CH_3)—C_2H_4—N(CH_3)—(CH_2)_3—Si(OCH_3)_3$, $H_5C_2—N(CH_3)—C_2H_4—N(CH_3)—(CH_2)_3—Si(OCH_3)_3$, $H_2N—(CH_2)_3—Si(OC_2H_5)_3$, $H_3C—N(CH_3)—(CH_2)_3—Si(OC_2H_5)_3$, $H_5C_2—N(CH_3)—(CH_2)_3—Si(OC_2H_5)_3$, $H_2N—C_2H_4—N(CH_3)—(CH_2)_3—Si(OC_2H_5)_3$, $H_3C—N(CH_3)—C_2H_4—N(CH_3)—(CH_2)_3—Si(OC_2H_5)_3$, $H_5C_2—N(CH_3)—C_2H_4—N(CH_3)—(CH_2)_3—Si(OC_2H_5)_3$, $H_2N—C_2H_4—N(CH_3)—CH_2—C_6H_4—C_2H_4—Si(OCH_3)_3$, $H_2N—C_2H_4—N(CH_3)—CH_2—C_6H_4—C_2H_4—Si(OC_2H_5)_3$, $H_2N—(CH_2)_3—Si(OCH_3)_3$, $H_3C—N(C_2H_5)—(CH_2)_3—Si(OCH_3)_3$, $H_5C_2—N(C_2H_5)—(CH_2)_3—Si(OCH_3)_3$, $H_2N—C_2H_4—N(C_2H_5)—(CH_2)_3—Si(OCH_3)_3$, $H_3C—N(C_2H_5)—C_2H_4—N(C_2H_5)—(CH_2)_3—Si(OCH_3)_3$, $H_5C_2—N(C_2H_5)—C_2H_4—N(C_2H_5)—(CH_2)_3—Si(OCH_3)_3$, $H_2N$—$(CH_2)_3$—$Si(OC_2H_5)_3$, $H_3C$—$N(C_2H_5)$—$(CH_2)_3$—$Si(OC_2H_5)_3$, $H_5C_2$—$N(C_2H_5)$—$(CH_2)_3$—$Si(OC_2H_5)_3$, $H_2N$—$C_2H_4$—$N(C_2H_5)$—$(CH_2)_3$—$Si(OC_2H_5)_3$, $H_3C$—$N(C_2H_5)$—$C_2H_4$—$N(C_2H_5)$—$(CH_2)_3$—$Si(OC_2H_5)_3$, $H_5C_2$—$NH$—$C_2H_4$—$N(C_2H_5)$—$(CH_2)_3$—$Si(OC_2H_5)_3$, $H_2N$—$C_2H_4$—$N(C_2H_5)$—$CH_2$—$C_6H_4$—$C_2H_4$—$Si(OCH_3)_3$, $H_2N$—$C_2H_4$—$N(C_2H_5)$—$CH_2$—$C_6H_4$—$C_2H_4$—$Si(OC_2H_5)_3$.

When using said compounds in replacement of compounds of the general formula II, the great advantage is that they act as base and take over the function of the condensation catalyst. A further advantage is that excess base does not have to be removed from the reaction medium after condensation is terminated, since it is completely incorporated in the inorganic network.

In further embodiments of the silicic acid polycondensates according to the invention, the radical $R^1$ of the general formula V carries —OH and/or —SH and/or —$NH_2$ groups. Said radicals cause an increase of the absorption in the NIR, but after polycondensation they can be used for coupling with other components, the absorption of the resulting materials thereby being reduced again. With the help of the aforementioned radicals, the resulting polycondensates can be provided with further functionalities. In this way, a chemical modification of the polycondensates according to the invention is possible. Thus, e.g. triacrylates can be added by performing a Michael condensation onto a —$CH_2$—SH group, thereby forming a thioether group. Further examples of a chemical modification are the formation of urethane and urea derivatives, respectively, by addition of isocyanate compounds onto —$CH_2$—OH and —$CH_2$—$NH_2$ groups, respectively, of the polycondensates.

Up to 90 mole percent of the compounds of the general formula II can be replaced by one or more compounds of the general formula III and/or IV and/or V. In preferred embodiments of the silicic acid polycondensates according to the invention, not more than 80 mole percent of the compounds of the general formula II are replaced by compounds of the general formula III and/or IV and/or V.

Further embodiments of the silicic acid polycondensates according to the invention are obtainable by adding organically modified silicic acid polycondensates according to the invention as a resin and/or particles to the reaction medium prior to and/or during and/or after condensation. The advantage is that different properties of different resin or resin particle systems can be combined. In this way, the properties of the resulting polycondensates, such as for example the refractive index, thermal expansion coefficient or polymerization shrinkage, can be adapted to the requirements of the particular application case.

The production of the silicic acid polycondensates according to the invention is effected in a single-stage, anhydrous process. In the synthetic scheme, no water is used as an educt. Thereby, an unambiguous reaction sequence is enforced and secondary reactions are suppressed. Due to the presence of a base and an increased reaction temperature, e.g. at 50° C., a short reaction period and an almost stoichiometric conversion of the educts is obtained.

When condensing two or more compounds of the general formula I and/or II with each other, all educts are homogeneously condensed into the silicic acid polycondensate according to the invention by the reaction scheme according to the invention. Said homogeneous condensation allows to selectively and gradually adjust (index tuning) the refractive index of the resulting silicic acid polycondensates.

The silicic acid polycondensate/alcohol mixture obtained is concentrated at an increased temperature until complete removal of the volatile components. The completeness of the reaction can be controlled by the decrease in weight according to the stoichiometric equation. The total mass of the batch will decrease exactly by a previously calculated mass of volatile components. The analysis of the volatile components removed will confirm the assumptions concerning the stoichiometry of the conversion.

The silicic acid polycondensates according to the invention can be used either as such or in compositions additionally containing additives which are adapted to the intended application, e.g. usual paint additives, fillers, photoinitiators, thermal initiators, flow-control agents and pigments.

Surprisingly it was found that the polycondensates according to the invention are particularly stable in storage. Even when being stored for a prolonged term at room temperature (observed over a period of 1 year), they do not gel. Epoxy resins known from prior art only show low stability in storage. Already after a short term, the number of epoxy groups will decrease and the viscosity of said resins will increase. Surprisingly it was found that even inventive polycondensates having epoxy groups show excellent stability in storage as described above. Therefore, the polycondensates according to the invention provide epoxy resins having an excellent stability in storage.

The silicic acid polycondensates according to the invention do not have any or have only a small number of SiOH groups. They are UV curable and NIR permeable, particularly the permeability at wave lengths of 1310 nm and 1550 nm being important for technical applications in optical data processing. Effecting curing, i.e. polymerization of the C=C double bonds and of the epoxy groups, respectively, is accompanied by a sufficiently low shrinkage. Thereby, the formation of cracks is avoided even for layers having a high thickness. It is assumed that the absence of Si—OH groups and of volatile components in the silicic acid polycondensates according to the invention is responsible for this effect. Moreover, the silicic acid polycondensates according to the invention are photostructurable in layers having a thickness of up to 150 μm without loss in quality. These properties render the silicic acid polycondensates according to the invention extraordinarily suitable for use as photoresists, as a negative resist, as a dielectric, as light transmitting transparent material or as photostructurable insulating material for micro systems technology. Just in this technology photostructurable materials are needed which require a high reproducibility of the material properties, such as viscosity, solubility, water content, etc. The silicic acid polycondensates according to the invention are very well suited for these applications. They present a very good reproducibility of all material properties, such as e.g. the refractive index (±0.001), the optical attenuation and the working properties in all process steps of UV structuring.

The silicic acid polycondensates according to the invention are inorganically reacted to completeness and show a reduced release of volatile components, such as water or alcohol, during the thermal curing process and therefore, they are well embossable.

The use of the silicic acid polycondensates according to the invention is not limited to the aforementioned applications. Wherever organically modified silicic acid polycondensates can be used as scratch-resistant coatings for a very wide range of substrates, as adhesive and sealing compounds or for the production of moldings, it is possible to make use of the silicic acid polycondensates according to the invention due to their excellent material properties. The silicic acid polycondensates according to the invention excellently adhere to a very wide range of substrates, such as for example to metals, to glass or to oxidic surfaces. As far as metals are concerned, particularly the adhesion to aluminum and to silicon is to be mentioned.

Therefore, the inventive silicic acid polycondensates or compositions containing same are excellently suited for the production of coating, filler or bulk materials, of adhesives and injection molding materials, of fibers, foils or films, adhesion agents, of impression materials and of embedding compounds. Particular fields of application are e.g. the coating of substrates made of metal, plastic, paper, ceramics, etc. by dipping or immersion, casting, painting, spray-painting, electrostatic sputtering, electro-dipcoating, etc., the use for optical, optoelectrical or electronic components, the production of fillers, abrasion-resistant anticorrosion coatings, the production of moldings, e.g. by injection molding, casting or extrusion, and the production of composites, e.g. comprising fibers, fillers or woven fabrics.

After polycondensation and prior to further processing, solvents can be added to the polycondensate for dilution. The final curing of the inventive silicic acid polycondensates is effected by thermal or photochemical methods, if necessary after adding suitable initiators, wherein said curing mechanisms can also proceed in parallel and/or subsequently. During polymerization or polyaddition, the C=C double bonds or the epoxy groups, respectively, are linked together, and the organic network is formed. Due to the relatively high molecular weights of the polycondensates according to the invention, their volume shrinkage during curing is only small.

It is also possible to add further ionically and/or radically polymerizable components to the inventive polycondensate prior to final curing, thus e.g. prior to polymerization. Radically polymerizable compounds that can be added are e.g. compounds having C=C double bonds, such as acrylates or methacrylates, wherein polymerization occurs via said C=C double bonds. Ionically polymerizable compounds that can be added may contain e.g. cyclic systems that are polymerizable by a cationic ring-opening polymerization, such as spiroorthoesters, spiroortho carbonates, bicyclic spiroorthoesters, mono or oligoepoxides or spirosilanes. Further, compounds can be added that are both ionically and radically polymerizable, as e.g. methacryloyl spiroorthoesters. Polymerization of these compounds can be effected radically via the C=C double bond or cationically by ring-opening. Said systems are e.g. described in Journal f. prakt. Chemie, vol. 330, issue 2, 1988, p. 316–318, or in Journal of Polymer Science: Part C: Polymer Letters, vol. 26, p. 517–520 (1988).

When the polycondensates according to the invention are cured by photochemical methods, photoinitiators are added thereto, and when they are cured by thermal hardening methods, thermal initators are added. The initiator may be added in usual quantities. Thus, e.g. to a mixture containing 30 to 50 weight-% of solid substance (polycondensate), initiators can be added in a quantity of e.g. 0.5 to 5 weight-%, particularly 1 to 3 weight-%, in relation to the mixture.

Commercially available photoinitiators can e.g. be used. Examples are Irgacure 184 (1-hydroxy cyclohexyl phenyl ketone), Irgacure 500 (1-hydroxy cyclohexyl phenyl ketone/benzophenone) and other photoinitiators of the Irgacure type which are available from Ciba-Geigy; Darocure 1173, 1116, 1398, 1174 and 1020 (available from Merck), benzophenone, 2-chlorothioxanthone, 2-methylthioxanthone, 2-isopropylthioxanthone, benzoin, 4,4'-dimethoxybenzoin, etc. When curing is effected by visible light, camphorquinone may for example be used as an initiator.

As thermal initiators, particularly organic peroxides are suited, for example diacyl peroxides, peroxydicarbonates, alkyl per-esters, dialkyl peroxides, perketalene, ketone peroxides and alkyl hydroperoxides. Concrete and preferred examples of thermal initiators are dibenzoyl peroxide, t-butyl perbenzoate and azobisisobutyronitrile.

When diluting the silicic acid polycondensates according to the invention by a solvent, said solvent is preferably allowed to dry off prior to curing. Therafter, it can be cured thermally or photochemically as know per se, depending on the type of initiator. Combinations of hardening methods are of course also possible.

When curing of the inventive silicic acid polycondensates is effected by radiation, it can be advantageous to effect a thermal curing step subsequently to the radiation curing, particularly for removing solvent that is still present or for introducing further reactive groups into the curing process.

The polycondensates according to the invention are structured photochemically, if necessary by adding usual initiators. Suitable initiators are e.g. the Irgacure® products of CIBA or the Cyracure® products of Union Carbide. Both polycondensates having C=C double bonds (radically initiated) and polycondensates having expoxy groups (ionically induced) can be photochemically structured.

The silicic acid polycondensates are described in more detail by way of specific examples.

EXAMPLE 1

| Educts | |
|---|---|
| (1) diphenylsilanediol | 1 mole |
| (2) 3-methacryloxypropyl trimethoxysilane | 1 mole |
| (3) barium hydroxide monohydrate | 0.4 g (0.002 mole) |

Synthesis

Component (1) is provided. Then (2) and finally (3) are added. The mixture is heated to 80° C. and vigorously stirred under reflux. After 4 minutes, a clear solution is formed, after 15 minutes, the reaction is completed. The resulting solution is concentrated at 80° C. under reduced pressure, at first 40 minutes at 670 mbar. Next, pressure is slowly reduced to 400 mbar within 20 minutes and subsequently gradually to 6 mbar and is maintained at said value for one hour. Subsequently, at a pressure of 6 mbar, temperature is increased to 90° C. for one hour, for completely removing the methanol formed during the reaction. Thereafter, the resulting resin is pressure-filtered at 0.2 μm.

Optical Properties of the Resulting Resin

The resulting resin does not show Si—OH groups in the infrared spectrum.

| | |
|---|---|
| Refractive index at 25° C. | = 1.5382. |
| Optical attenuation in the NIR | = 0.30 dB/cm at 1310 nm |
| | = 0.65 dB/cm at 1550 nm. |

Reproduction of the Experiment

| Educts | |
|---|---|
| (1) diphenylsilanediol | 1 mole |
| (2) 3-methacryloxypropyl trimethoxysilane | 1 mole |
| (3) barium hydroxide monohydrate | 0.4 g (0.002 mole) |

Synthesis is effected as described above.

Optical Properties of the Resulting Resin

The resulting resin does not show Si—OH groups in the infrared spectrum.

| | |
|---|---|
| Refractive index at 25° C. | = 1.5382. |
| Optical attenuation in the NIR | = 0.30 dB/cm at 1310 nm |
| | = 0.65 dB/cm at 1550 nm. |

The viscosity of said two resins and that of four additional resins (according to the same synthetic scheme) is 5.2±0.4 Pa·s.

EXAMPLE 2

| Educts | |
|---|---|
| (1) diphenylsilanediol | 95.18 g (0.44 mole) |
| (2) 3.3.3-trifluoropropyl trimethoxysilane | 48.02 g (0.22 mole) |
| (3) 3-methacryloxypropyl trimethoxysilane | 54.64 g (0.22 mole) |
| (4) barium hydroxide monohydrate | 0.15 g (0.0008 mole) |

Synthesis

Component (1) is provided. Then (3) and (2) and finally (4) are added. The mixture is heated to 80° C. and vigorously stirred under reflux. After 4 minutes, a clear solution is formed, after 15 minutes, the reaction is completed. The resulting solution is concentrated at 80° C. under reduced pressure, at first 40 minutes at 670 mbar. Then, pressure is slowly reduced to 400 mbar within 20 minutes and subsequently gradually to 6 mbar and is maintained at said value for one hour. Subsequently, at a pressure of 6 mbar, temperature is increased to 90° C. for one hour, for completely removing the methanol formed during the reaction.

Optical Properties of the Resulting Resin:

The resulting resin does not show Si—OH groups in the infrared spectrum.

| | |
|---|---|
| Refractive index at 25° C. | = 1.5243. |
| Optical attenuation in the NIR | = 0.27 dB/cm at 1310 nm |
| | = 0.50 dB/cm at 1550 nm. |

Reproduction of the Experiment

The reproduction of the synthesis provides a resin having an identical infrared spectrum and a refractive index of 1.5245 at 25° C. The optical attenuation values of the resin in the NIR are identical with those mentioned above within the scope of measuring accuracy.

Further, the following resins were produced according to the synthetic scheme described in examples 1 and 2.

EXAMPLE 3

| Educts | |
|---|---|
| (1) diphenylsilanediol | 21.26 g (0.1 mole) |
| (2) 3-methacryloxypropyl trimethoxysilane | 19.87 g (0.08 mole) |
| (3) 3-aminopropyl trimethoxysilane | 3.58 g (0.02 mole) |

The condensation is catalyzed by the 3-aminopropyl group of component (3).

EXAMPLE 4

| Educts | |
|---|---|
| (1) diphenylsilanediol | 21.63 g (0.1 mole) |
| (2) 3-methacryloxypropyl trimethoxysilane | 20.68 g (0.084 mole) |
| (3) Zr(OPr)$_4$ | 2.62 g (0.008 mole) |

The condensation is catalyzed by component (3).

EXAMPLE 5

| Educts | |
|---|---|
| (1) diphenylsilanediol | 95.18 g (0.44 mole) |
| (2) 3.3.3-trifluoropropyl trimethoxysilane | 48.02 g (0.22 mole) |
| (3) 3-methacryloxypropyl trimethoxysilane | 54.64 g (0.22 mole) |
| (4) barium hydroxide monohydrate | 0.15 g (0.0008 mole) |

EXAMPLE 6

| Educts | |
|---|---|
| (1) diphenylsilanediol | 21.63 g (0.100 mole) |
| (2) 3-methacryloxypropyl trimethoxysilane | 15.90 g (0.064 mole) |
| (3) Al(O-s-Bu)$_3$ | 5.91 g (0.024 mole) |

The condensation is catalyzed by component (3).

EXAMPLE 7

| Educts | |
|---|---|
| (1) diphenylsilanediol | 1.77 g (0.008 mole) |
| (2) tridecafluoro-1.1.2.2-tetra-hydrooctyl-triethoxysilane | 4.21 g (0.008 mole) |
| (3) triethylamine | 3 drops |

The condensation is catalyzed by component (3).

EXAMPLE 8

Educts

| | |
|---|---|
| (1) diphenylsilanediol | 108.18 g (0.5 mole) |
| (2) 2-(3.4-epoxycyclohexyl)ethyl trimethoxysilane | 123.19 g (0.5 mole) |
| (3) barium hydroxide monohydrate | 0.2 g (0.001 mole) |

The theoretical epoxid content of the resin, the real content immediately after production, after 30 days and after one year is 2.4 mmole/g, respectively.

EXAMPLE 9

Educts

| | |
|---|---|
| (1) diphenylsilanediol | 108.18 g (0.5 mole) |
| (2) 3-methacryloxypropyl trimethoxysilane | 62.09 g (0.25 mole) |
| (3) 2-(3.4-epoxycyclohexyl)ethyl trimethoxysilane | 61.6 g (0.25 mole) |
| (4) barium hydroxide monohydrate | 0.2 g (0.001 mole) |

EXAMPLE 10

Educts

| | |
|---|---|
| (1) diphenylsilanediol | 21.63 g (0.1 mole) |
| (2) 2-(3.4-epoxycyclohexyl)ethyl trimethoxysilane | 12.32 g (0.05 mole) |
| (3) vinyltrimethoxysilane | 7.41 g (0.05 mole) |
| (4) barium hydroxide monohydrate | 0.038 g (0.0002 mole) |

EXAMPLE 11

Educts

| | |
|---|---|
| (1) diphenylsilanediol | 108.18 g (0.5 mole) |
| (2) 2-(3.4-epoxycyclohexyl)ethyl trimethoxysilane | 123.19 g (0.5 mole) |
| (3) ammonium fluoride | 0.05 g (0.0013 mole) |

The water content of all resins according to examples 1 to 11 is less than 0.01% (=100 ppm) and is determined by a Karl Fischer titration. All resins described are UV structurable, thermally curable without crack formation at temperatures markedly above 200° C. and applicable in several layers one upon the other. The thermally cured layers do not show modifications after climate investigations during 7 days.

What is claimed is:

1. A composition comprising a photoinitiator and a silicic acid polycondensate, wherein the silicic acid polycondensate is produced by a process comprising condensing one or more organically modified silanediols of the general formula I $$Ar_2Si(OH)_2 \quad (I)$$

with one or more organically modified silanes of the general formula II $$RSi(OR')_3 \quad (II),$$

wherein said condensing is performed without adding water the molar ratio of, wherein said silanediols of the general formula I to said silanes of the general formula II is 1:1, wherein up to 90 mole percent of said silane of the general formula II is optionally replaced by one or more co-condensable compounds selected from the group consisting of boron compounds, aluminum compounds, silicon compounds, germanium compounds, titanium compounds and zirconium compounds, and wherein Ar is a radical comprising 6 to 20 carbon atoms and one or more aromatic groups, R is an organic radical comprising 2 to 15 carbon atoms and one or more epoxy groups and/or one or more C=C double bonds, R' is methyl or ethyl, wherein said photoinitiator is present in said composition in a quantity effective for photochemical curing via UV.

2. The composition of claim 1, wherein said one or more co-condensable compounds comprise compounds of the general formula III, $$M(OR'')_3 \quad (III),$$

wherein M is boron or aluminum, R'' is an alkyl radical comprising 1 to 4 carbon atoms, and wherein said silanediols of the general formula I, said silanes of the general formula (II) and said compounds of the general formula (III) are present in the resultant polycondensate in a molar ratio $(I):(II):(III)=1:(1-x_{III}):2/3x_{III}$, wherein $x_{III}$ is greater than 0 and less or equal than 0.9.

3. The composition of claim 2, wherein $x_{III}$ is greater than 0 and less or equal than 0.8.

4. The composition of claim 2, wherein said compounds of the general formula III are condensation catalysts in said condensing.

5. The composition of claim 1, wherein said one or more co-condensable compounds comprise compounds of the general formula IV $$M'(OR'')_4 \quad (IV),$$

wherein M' is silicon, germanium, titanium or zirconium, R'' is an alkyl radical comprising 1 to 4 carbon atoms, and wherein said silanediols of the general formula I, said silanes of the general formula (II) and said compounds of the general formula (IV) are present in the resultant polycondensate in a molar ratio $(I):(II):(IV)=1:(1-x_{IV}):1/2x_{IV}$, wherein $x_{IV}$ is greater than 0 and less or equal than 0.9.

6. The composition of claim 5, wherein $x_{IV}$ is greater than 0 and less or equal than 0.8.

7. The composition of claim 5, wherein said compounds of the general formula IV when M is titanium or zirconium are condensation catalysts in said condensing.

8. The composition of claim 1, wherein said one or more co-condensable compounds comprise compounds of the general formula V:

$$R_1Si(OR')_3 \quad (V),$$

wherein

R' is methyl or ethyl;

$R_I$ is selected from a group consisting of $CF_3$—$(C_2F_n)$—$C_2H_4$—; $R_2HN$—$(CH_2)_3$—; —$C_2H_4$—$NHR_2$; $H_2N$—$C_2H_4$—NH—$CH_2$—$C_6H_4$—$C_2H_4$; substituted and unsubstituted alkyl comprising 1 to 8 carbon atoms; and substituted and unsubstituted phenyl, tolyl and naphtyl, wherein n is an integer from 0 to 7, wherein $R_2$ is H, $CH_3$ or $C_2H_5$, wherein $R_1$ optionally comprises one or more SH groups, one or more $N(R^*)_2$ groups or a combination thereof, wherein $R^*$ is hydrogen or alkyl, and wherein said silanediols of the general formula (I), said silanes of the general formula (II) and said compounds of the general formula (V) are present in the resultant polycondensate in a molar ratio $(I):(II):(V)=1:(1-x_v):(x_v)$, wherein $x_v$ is more than 0 and less or equal than 0.9.

9. The composition of claim 8, wherein said compounds of the general formula V, wherein $R^1$ being $R^2HN$—$(CH_2)_3$—, where $R^2$=H, $CH_3$, $C_2H_5$, or HN—$C_2H_4$—$NH_2$—$CH_2$—$C_6H_4$—$C_2H_4$—, are condensation catalysts in said condensing.

10. The composition of claim 8, wherein $x_V$ is greater than 0 and less or equal than 0.8.

11. The composition of claim 8, wherein $R_1$ of the general formula V comprises one more SH groups, one or more $N(R^*)_2$ groups or a combination thereof, wherein $R^*$ is hydrogen or alkyl.

12. The composition of claim 1, wherein said condensing is carried out in the presence of a condensation catalyst, wherein the condensation catalyst is triethylamine, $NH_4F$ or alkaline earth hydroxide.

13. The composition of claim 1, wherein Ar of said organically modified silanediols of the general formula I is a substituted aromatic group.

14. The composition of claim 1, wherein Ar of said organically modified silanediols of the general formula I is a phenyl, naphthyl or styryl group.

15. The composition of claim 1, where the silicic acid polycondensate comprises one or more acryl groups or one or more methacryl groups.

16. The composition of claim 1, wherein said one or more double bonds of said radical R of said silanes of the general formula II are one or more double bonds of an acryl or a methacryl group.

17. A material comprising the composition of claim 1, wherein said material is photostructurable in layers of a thickness of 1 to 150 μm.

18. The material of claim 17, wherein said material is stable in storage.

19. The material of claim 17, wherein said material is NIR permeable.

20. A method for producing photocurable silicic acid polycondensates, comprising (a) condensing one or more organically modified silanediols of the general formula I $$Ar_2Si(OH)_2 \qquad (I)$$

with one or more organically modified silanes of the general formula II $$RSi(OR')_3 \qquad (II)$$

in the presence of a base without adding water, wherein a molar ratio of said silanediols of the general formula I to said silanes of the general formula II is 1:1, wherein up to 90 mole percent of said silane of the general formula II is optionally replaced by one or more co-condensable compounds selected from the group consisting of boron compounds, aluminum compounds, silicon compounds, germanium compounds, titanium compounds and zirconium compounds, and wherein Ar is a radical comprising 6 to 20 carbon atoms and one or more aromatic groups, R is an organic radical comprising 2 to 15 carbon atoms and one and/or more epoxy groups and/or one or more C=C double bonds, R' is methyl or ethyl; and (b) adding a photoinitiator.

21. A silicic acid polycondensate produced by condensing one or more organically modified silanediols of the general formula I $$Ar_2Si(OH)_2 \qquad (I)$$

with one or more organically modified silanes of the general formula II $$RSi(OR')_3 \qquad (II),$$

wherein said condensing is performed without adding water, wherein the molar ratio of said silanediols of the general formula I to said silanes of the general formula II is 1:1, wherein up to 90 mole percent of said silane of the general formula II is optionally replaced by one or more co-condensable compounds selected from the group consisting of boron compounds, aluminum compounds, silicon compounds, germanium compounds, titanium compounds and zirconium compounds, and wherein Ar is a radical comprising 6 to 20 carbon atoms and one or more aromatic groups, R is an organic radical comprising 2 to 15 carbon atoms and one or more epoxy groups and/or one or more C=C double bonds, R' is methyl or ethyl.

22. A material comprising the silicic acid polycondensate of claim 21, wherein said material is photostructurable in layers of a thickness of 1 to 150 μm.

23. A method for producing silicic acid polycondensates, comprising condensing one or more organically modified silanediols of the general formula I $$Ar_2Si(OH)_2 \qquad (I)$$

with one or more organically modified silanes of the general formula II $$RSi(OR')_3 \qquad (II),$$

wherein said condensing is performed without adding water, wherein the molar ratio of said silanediols of the general formula I to said silanes of the general formula II is 1:1, wherein up to 90 mole percent of said silane of the general formula II is optionally replaced by one or more co-condensable compounds selected from the group consisting of boron compounds, aluminum compounds, silicon compounds, germanium compounds, titanium compounds and zirconium compounds, and wherein Ar is a radical comprising 6 to 20 carbon atoms and one or more aromatic groups, R is an organic radical comprising 2 to 15 carbon atoms and one or more epoxy groups and/or one or more C=C double bonds, R' is methyl or ethyl.

* * * * *

UNITED STATES PATENT AND TRADEMARK OFFICE
CERTIFICATE OF CORRECTION

PATENT NO. : 6,984,483 B1
APPLICATION NO. : 10/030910
DATED : January 10, 2006
INVENTOR(S) : Christof Roscher and Ralf Buestrich It is certified that error appears in the above-identified patent and that said Letters Patent is hereby corrected as shown below:

IN THE SPECIFICATION

The exact column and line number where the errors in the issued patent are shown correctly in the application are:

In column 4, line 18, delete "containes" and replace with -- contains --

In column 14, line 10, deleet "Therafter" and replace with -- Thereafter --

In column 14, line 26, delete "expoxy" and replace with -- epoxy --

In column 8, line 44, delete "Al(O-s-C $_4H_9)_3$" and replace with -- Al(O-s-$C_4H_9)_3$ --

In column 9, line 10, delete "Si(O-s-C $_4H_9)_4$" and replace with -- Si(O-s-$C_4H_9)_4$ --

In column 9, line 13, delete "Ti(O-i-C $_3H_7)_4$" and replace with -- Ti(O-i-$C_3H_7)_4$ --

In column 11, line 6, delete "$H_2N-C_2H_4-N(C_2H_5)-CH_2-C_6H_4-C_2H_4-\ Si(OCH_3)_3$" and replace with -- $H_2N-C_2H_4-N(C_2H_5)-CH_2-C_6H_4-C_2H_4-Si(OCH_3)_3$ --

In column 10, line 14, insert formula --  --

IN THE CLAIMS

The exact claim and line number where the errors in the issued patent are shown correctly in the application file are:

In claim 1, line 6 of column 18, delete "the molar ratio of, wherein said silanedoils" and replace with -- wherein the molar ratio of said silanediols --

UNITED STATES PATENT AND TRADEMARK OFFICE
CERTIFICATE OF CORRECTION

PATENT NO. : 6,984,483 B1
APPLICATION NO. : 10/030910
DATED : January 10, 2006
INVENTOR(S) : Christof Roscher and Ralf Buestrich It is certified that error appears in the above-identified patent and that said Letters Patent is hereby corrected as shown below:

In claim 5, line 43 of column 18, delete "$M^3(OR")_4$" and replace with --$M'(OR")_4$--

In claim 8, lines 65-67 of column 18, delete "$R_l$ is selected from a group consisting of CF3— (C2Fn)—C2H4—; R2HN— (CH2)3—; —C2H4—NHR2; H2N—C2IL4—NII—CH$_2$—C$_6$H$_4$—C$_2$H$_4$; substituted" and replace with -- $R_l$ (instead of $R_1$ ["1"]) is selected from a group consisting of $CF_3$-$(CF_2)_n$-$C_2H_4$- (instead of $CF_3$-$(C_2F_n)$-$C_2H_4$-); $R_2HN$-$(CH_2)_3$-; -$C_2H_4$-$NHR_2$; $H_2N$-$C_2H_4$-$NH$-$CH_2$-$C_6H_4$-$C_2H_4$ (instead of $H_2N$-$C_2IL_4$-$NII$-$CH_2$-$C_6H_4$-$C_2H_4$); substituted.... --.

In claim 9, lines 15 and 16 of column 19, delete "being $R^2HN$—$(CH_2)_3$—, where $R^2$=H," and replace with -- being $R_2HN$—$(CH_2)_3$—, where $R^2 = H$ --.

Signed and Sealed this

First Day of May, 2007

JON W. DUDAS
*Director of the United States Patent and Trademark Office*